United States Patent [19]

Leroy et al.

[11] Patent Number: 4,465,796

[45] Date of Patent: Aug. 14, 1984

[54] FRICTION LINING SUITABLE FOR USE IN BRAKES, CLUTCHES AND OTHER APPLICATIONS

[75] Inventors: Pierre Leroy, Saint Mande; Michel Pilache, Beauchamp, both of France

[73] Assignee: Valeo, Paris, France

[21] Appl. No.: 463,052

[22] Filed: Feb. 1, 1983

[30] Foreign Application Priority Data

Feb. 5, 1982 [FR] France .................. 82 01868

[51] Int. Cl.$^3$ .............................................. C08K 3/22
[52] U.S. Cl. ................................. 523/153; 523/155; 523/156
[58] Field of Search ............... 523/153, 155, 156

[56] References Cited

U.S. PATENT DOCUMENTS

| 3,896,075 | 7/1975 | Longley | 523/153 |
|---|---|---|---|
| 4,150,011 | 4/1979 | Searfoss et al. | 523/153 |
| 4,187,209 | 2/1980 | Searfoss et al. | 523/153 |
| 4,268,467 | 5/1981 | Wagner | 264/111 |
| 4,273,699 | 6/1981 | Chester | 523/153 |
| 4,374,059 | 2/1983 | Wagner | 523/153 |
| 4,388,423 | 6/1983 | Kaufman et al. | 523/155 |

FOREIGN PATENT DOCUMENTS

| 2254294 | 5/1973 | Fed. Rep. of Germany . | |
| 2197960 | 3/1974 | France . | |
| 57-121080 | 7/1982 | Japan | 523/153 |
| 2011448 | 7/1979 | United Kingdom . | |

*Primary Examiner*—Lewis T. Jacobs
*Attorney, Agent, or Firm*—Young & Thompson

[57] ABSTRACT

A friction lining suitable for brakes, clutches etc. comprises mineral fibres which contain alumina, $Al_2O_3$, silica, $SiO_2$, and lime, CaO. The mineral fibres have a percentage by weight of alumina, $Al_2O_3$, of between 18% and 25%, a percentage by weight of silica, $SiO_2$, of between 38% and 45% and a percentage by weight of lime, CaO, of between 23% and 33% and preferably of the order of 27%. Moreover, the mineral fibres contain iron oxide, $Fe_2O_3$, in a proportion by weight of between 0.5% and 1%, alkali metal oxides, $Na_2O$ and $K_2O$, in a proportion by weight of between 4% and 10% and magnesia, MgO, in a proportion by weight of between 0.5% and 3%.

19 Claims, No Drawings

FRICTION LINING SUITABLE FOR USE IN BRAKES, CLUTCHES AND OTHER APPLICATIONS

BACKGROUND OF THE INVENTION

The present invention relates to a friction lining, in particular for use in brakes, clutches and other applications, having mineral fibres which contain alumina, $Al_2O_3$, silica, $SiO_2$, and lime, CaO.

In friction linings of this type, it has already been proposed to use slag fibres and also basalt fibres as mineral fibres.

In general, slag fibres have a precentage by weight of alumina, $Al_2O_3$, of between 10% and 15%, a percentage by weight of silica, $SiO_2$, of between 38% and 45% and a percentage by weight of lime CaO, of between 35% and 45%, while basalt fibres have a percentage by weight of alumina, $Al_2O_3$, of between 10% and 20%, a percentage by weight of silica, $SiO_2$, of between 38% and 46% and a percentage by weight of lime, CaO, of between 10% and 18%.

The applicants have found that friction linings containing slag fibres are relatively brittle in contrast to friction linings containing basalt fibres, which frequently have an excessive aggressiveness towards the counter-material, such as the disc, ring, drum or plate, with which the friction lining interacts by rubbing.

Experiments carried out by the applicants have shown that the proportion of lime, CaO, in the mineral fibres is of prime importance in determining the brittleness and the aggressiveness of the friction lining.

The relatively high percentage of lime, CaO, of between 35% and 45% in slag fibres would explain the brittleness of linings containing slag fibres, while the relatively low percentage of lime, CaO, of between 10% and 18% in basalt fibres would explain the aggressiveness towards the counter-material of friction linings containing basalt fibres.

Experiments have shown that mineral fibres having a smaller proportion of lime, CaO, than in the case of slag fibres, but a higher proportion thereof than in the case of basalt fibres have the effect of substantially reducing the brittleness and also the aggressiveness of the friction lining.

The present invention relates to a friction lining, in particular for brakes, clutches and other applications, having mineral fibres which contain alumina, $Al_2O_3$, silica, $SiO_2$, and lime, CaO, and which possess excellent rubbing characteristics and good properties as regards both the robustness and the absence of aggressiveness towards the counter-material.

SUMMARY

According to the invention, a friction lining, in particular for brakes, clutches and other applications, having mineral fibres which contain alumina, $Al_2O_3$, silica, $SiO_2$, and lime, CaO, is characterised in that the said fibres have overall a percentage by weight of lime, CaO, of between 23% and 33% and preferably of the order of 27%.

By virtue of this arrangement, the friction lining containing such mineral fibres with this percentage by weight of lime, CaO, is particularly robust and does not cause any deterioration in the counter-material.

In one embodiment, each fibre of the lining has substantially the same composition, while, as a variant, the lining contains a mixture of fibres of different compositions.

According to other characteristics of the invention, the mineral fibres of the friction lining have a percentage by weight of alumina, $Al_2O_3$, of between 18% and 25% and a percentage by weight of silica, $SiO_2$, of between 38% and 45%.

Moreover, the mineral fibres preferably contain iron oxide, $Fe_2O_3$, in a proportion by weight of between 0.5% and 1%, alkali metal oxides, $Na_2O$ and $K_2O$, in a proportion by weight of between 4% and 10% and magnesia, MgO, in a proportion by weight of between 0.5% and 3%.

Excellent results have been obtained with these various constituents in the proportions indicated. In particular, the friction lining has good heat resistance characteristics, due to the relatively high proportion of alumina, $Al_2O_3$, of between 18% and 25% and to the proportion of magnesia, MgO, of between 0.5% and 3%.

According to another characteristic, the mineral fibres advantageously have a diameter of between 3 and 20 microns, and preferably of the order of 10 microns. This relatively large diameter is totally consistent with the conditions desirable for health and safety at work.

Examples are given below without implying a limitation.

EXAMPLE I

A friction lining for a disc brake sector has mineral fibres.

These mineral fibres contain alumina, $Al_2O_3$, silica, $SiO_2$, lime, CaO, iron oxide, $Fe_2O_3$, alkali metal oxides, $Na_2O$ and $K_2O$, and magnesia, MgO, in the following proportions by weight:

Alumina, $Al_2O_3$: between 18% and 25%
Silica, $SiO_2$: between 38% and 45%
Lime, CaO: between 23% and 33%
Iron oxide, $Fe_2O_3$: between 0.5% and 1%
Alkali metal oxides,
$Na_2O$ and $K_2O$: between 4% and 10%
Magnesia, MgO: between 0.5% and 3%

More particularly, in this example, the proportions by weight of the constituents of the mineral fibres are as follows:

Alumina, $Al_2O_3$: 18%
Silica, $SiO_2$: 38%
Lime, CaO: 33%
Iron oxide, $Fe_2O_3$: 0.5%
Alkali metal oxides,
$Na_2O$ and $K_2O$: 10%
Magnesia, MgO: 0.5%

To form these mineral fibres, their constituents are mixed and melted in a crucible; a molten jet leaves the crucible and is treated in spinnerets, or on centrifugation discs, or by means of gas jets, so as to give a fibre diameter of between 3 and 30 microns and preferably of the order of 10 microns.

To form the friction lining, a wool is used which consists of the mineral fibres just described and also other constituents in the following proportions:

| Constituents | Range of percentages | Preferred percentage |
| --- | --- | --- |
| phenol/formaldehyde resin | 11% to 21% | 16% |
| cardolite | 7% to 13% | 10% |
| powdered rubber waste | 2% to 4% | 3% |
| barium sulphate | 10% to 20% | 15% |
| Meudon white | 7% to 13% | 10% |

| Constituents | Range of percentages | Preferred percentage |
|---|---|---|
| cyanite | 3% to 7% | 5% |
| brass wool | 4% to 8% | 6% |
| wool formed of the mineral fibres | 25% to 45% | 35% |

A mixture is formed with these various constituents, pelletised under a pressure of 200 bars and heated in a mould for 15 minutes at a temperature of 140° C. and under a pressure of 300 bars. The pellet thus obtained is stabilised by superheating in an oven for 5 hours at a temperature of 220° C.

The friction lining thus obtained possesses excellent rubbing characteristics and also good properties, in particular as regards its robustness and its absence of aggressiveness towards the counter-material formed by the disc of a disc brake.

EXAMPLE II

This example relates to an organometallic lining for a disc brake.

This lining contains a wool formed of mineral fibres produced as described in Example I, but comprising constituents in the following proportions by weight:

Alumina, $Al_2O_3$: 22%
Silica, $SiO_2$: 40%
Lime, CaO: 29%
Iron oxide, $Fe_2O_3$: 1%
Alkali metal oxides, $Na_2O$ and $K_2O$: 5%
Magnesia, MgO: 3%

The lining comprises the following constituents in the following proportions by weight:

| Constituents | Range of percentages | Preferred percentage |
|---|---|---|
| phenol/formaldehyde resin | 5% to 11% | 8% |
| graphite | 2% to 4% | 3% |
| carbon black | 1% to 3% | 2% |
| coke | 7% to 13% | 10% |
| Molybdenum sulphide | 1% to 3% | 2% |
| copper powder | 3% to 7% | 5% |
| steel wool | 25% to 76% | 30% |
| iron powder | 0% to 50% | 28% |
| wool formed of mineral fibres | 8% to 16% | 12% |

A mixture comprising these constituents is pelletised under a pressure of 200 bars and heated for 15 minutes at a temperature of 140° C. and under a pressure of 750 bars. The pellet is stabilised by superheating in an oven for 2 hours at 250° C.

The lining thus obtained possesses excellent rubbing characteristics and also an excellent wear resistance together with an absence of aggressivenes towards the counter-material formed by a brake disc.

EXAMPLE III

This example relates to a friction lining for a drum brake.

The lining contains a wool formed of mineral fibres produced as described in Example I, but having the following constituents in the following proportions:

Alumina, $Al_2O_3$: 25%
Silica, $SiO_2$: 45%
Lime, CaO: 23%
Iron oxide, $Fe_2O_3$: 0.5%
Alkali metal oxides, $Na_2O$ and $K_2O$: 4%
Magnesia, MgO: 2.5%

The lining comprises the following constituents in the following proportions by weight:

| Constituents | Range of percentages | Preferred percentage |
|---|---|---|
| phenol/formaldehyde resin | 17% to 33% | 25% |
| powdered rubber waste | 3% to 7% | 5% |
| cardolite | 5% to 11% | 8% |
| tin powder | 1% to 3% | 2% |
| barium sulphate | 10% to 20% | 15% |
| iron oxide | 3% to 7% | 5% |
| wool comprising the mineral fibres | 25% to 55% | 40% |

This mixture is pelletised to the required shape. It is heated in a mould at a temperature of 140° C. and under a pressure of 75 bars. The pellet is stabilised by superheating in an oven for 8 hours at 200° C.

The lining thus obtained possesses excellent rubbing characteristics and also a good resistance and an absence of aggressiveness towards the counter-material formed by the brake drum.

EXAMPLE IV

This example relates to a clutch lining obtained by winding a filament impregnated with an impregnating cement.

The filament consists of a wool comprising mineral fibres having the composition according to Example I, fibranne and copper.

The filament has the following composition in percentages by weight:

| Constituents | Range of percentages | Preferred percentage |
|---|---|---|
| wool formed of mineral fibres | 30% to 50% | 40% |
| fibranne | 30% to 50% | 40% |
| copper | 15% to 25% | 20% |

A base filament comprises the mineral wool and the fibranne and is obtained by the process which consists in mixing, carding and then twisting together the two fibres. The copper filament can be introduced during twisting or simply combined with the filament comprising the mineral wool and the fibranne at the time of impregnation.

The impregnating cement comprises the following constituents in the following proportions by weight:

| Constituents | Range of percentages | Preferred percentage |
|---|---|---|
| styrene/butadiene rubber, SBR | 10% to 20% | 15% |
| phenol/formaldehyde resin | 7% to 13% | 10% |
| carbon black | 7% to 13% | 10% |
| graphite | 2% to 4% | 3% |
| galena | 10% to 20% | 15% |
| Meudon white | 7% to 13% | 10% |
| barium sulphate | 12% to 22% | 17% |
| kaolin | 3% to 13% | 10% |
| zircon | 3% to 7% | 5% |
| sulphur | 3% to 7% | 5% |

The impregnating cement consists of a suspension of pulverulent fillers in a solution of styrene/butadiene rubber, SBR, in trichloroethylene.

The filament which has been described above is impregnated continuously in this cement and then dried.

The proportion by weight of the filament and of the cement in the lining is between 40% and 70% for the filament and between 30% and 60% for the cement. Preferably, the proportion by weight is 90 grams of dry cement per 100 grams of filament. The impregnated and dried filament is then wound in the form of a ring, which constitutes the blank of a disc. This is heated in a mould for 20 minutes at a temperature of 160° C. and under a pressure of 500 bars. It is stabilised by superheating in an oven for 10 hours at a temperature of 180° C.

The clutch lining thus obtained possesses excellent rubbing characteristics. It has a high robustness and is not aggressive towards the counter-material formed by the clutch plates.

EXAMPLE V

This example relates to a friction lining for a disc brake pad. This lining, which contains a mixture of slag fibres and basalt fibres, the composition of which corresponds overall to a lime content of 28%, combines a sufficient mechanical strength, by virtue of the basalt fibres, with a very low aggressiveness towards the counter-material, by virtue of the presence of slag fibres.

The basalt fibres have the following composition by weight:
Alumina: 15%
Silica: 42%
Lime: 14%
Iron oxide: 16%
Magnesia: 13% and the slag fibres have the following composition by weight:
Alumina: 12%
Silica: 38%
Lime: 42%
Iron oxide: 0.5%
Magnesia: 7.5%

A mixture of basalt fibres and slag fibres is used to form a friction lining of which the constituents are in the following proportions by weight:

| Constituents | % ranges | Preferred % |
| --- | --- | --- |
| phenol/formaldehyde resin | 11 to 21 | 16 |
| cardolite | 7 to 13 | 10 |
| powdered rubber waste | 2 to 14 | 3 |
| barium sulphate | 10 to 20 | 15 |
| Meudon white | 7 to 13 | 10 |
| cyanite | 3 to 7 | 5 |
| brass wool | 4 to 8 | 6 |
| basalt wool | 12.5 to 22.5 | 17.5 |
| slag wool | 12.5 to 22.5 | 17.5 |

A mixture is formed with these various constituents, pelletised under a pressure of 200 bars and heated in a mould for 15 minutes at a temperature of 140° C. and under a pressure of 300 bars. The pellet thus obtained is stablised by superheating in an oven for 5 hours at 220° C.

The friction lining thus obtained possesses excellent rubbing characteristics and also good properties, in particular as regards its robustness. The aggressiveness towards the counter-material, although low, is more substantial than in the previous examples, but is still acceptable.

We claim:

1. A friction lining, suitable for brakes, clutches and other applications, comprising mineral fibres which contain substantial amounts of $Al_2O_3$, $SiO_2$ and $CaO$, wherein the said fibres have an overall percentage by weight of CaO of between 23% and 33%, the proportion by weight of the said mineral fibres in the friction lining being between 10% and 55%.

2. A friction lining according to claim 1, wherein each fibre has substantially the same composition.

3. A friction lining according to claim 1, wherein the lining contains a mixture of fibres of different compositions.

4. A friction lining according to claim 3, wherein the fibres of different compositions are, on the one hand, slag fibres, and, on the other hand, basalt fibres.

5. A friction lining according to claim 4, wherein the slag fibres and the basalt fibres are in substantially identical proportions.

6. A friction lining according to claim 1, wherein the said mineral fibres have an overall percentage by weight of $Al_2O_3$ of between 18% and 25%.

7. A friction lining according to claim 1, wherein the said mineral fibres have an overall percentage by weight of $SiO_2$ of between 38% and 45%.

8. A friction lining according to claim 1, wherein the said mineral fibres contain $Fe_2O_3$ in an overall proportion by weight of between 0.5 and 1%.

9. A friction lining according to claim 1, wherein the said mineral fibres contain $Na_2O$ and $K_2O$ in an overall proportion by weight of between 4% and 10%.

10. A friction lining according to claim 1, wherein the said mineral fibres contain MgO in an overall proportion by weight of between 0.5% and 3%.

11. A friction lining according to claim 1, wherein said lining contains not only the said mineral fibres but also at least some of the following constituents: phenol/formaldehyde resin, cardolite, powdered rubber waste, barium sulphate, coke, Meudon white, cyanite, brass wool, graphite, carbon black, molybdenum sulphide, copper powder, steel wool, iron powder, tin powder and iron oxide.

12. A friction lining according to claim 11, wherein the proportions by weight of the said constituents in the lining are as follows:
phenol/formaldehyde resin: between 5% and 33%
cardolite: between 0% and 13%
powdered rubber waste: between 2% and 7%
barium sulphate: between 7% and 20% coke: between 0% and 13%
Meudon white: between 0% and 13%
cyanite: between 0% and 7%
brass wool: between 0% and 8%
graphite: between 0% and 4%
carbon black: between 0% and 3%
molybdenum sulphide: between 0% and 3%
copper powder: between 0% and 7%
steel wool: between 0% and 76%
iron powder: between 0% and 50%
tin powder: between 0% and 3%
iron oxide: between 0% and 7%

13. A friction lining according to claim 1, wherein the lining contains a mixture of basalt fibres and slag fibres with constituents in the following proportions by weight:

phenol/formaldehyde resin: between 11% and 21%
cardolite: between 7% and 13%
powdered rubber waste: between 2% and 4%
barium sulphate: between 10% and 20%
Meudon white: between 7% and 13%
cyanite: between 3% and 7%
brass wool: between 4% and 8%
basalt wool: between 12.5% and 22.5%
slag wool: between 12.5% and 22.5%

14. A friction lining according to claim 1, wherein the lining comprises a filament impregnated with a cement, the said filament containing the said mineral fibres, fibranne and copper filament, while the cement contains at least some of the following constituents: styrene/butadiene rubber, phenol/formaldehyde resin, carbon black, graphite, galena, Meudon white, barium sulphate, kaolin, zircon and sulphur.

15. A friction lining according to claim 14, wherein the proportions by weight of the filament and the cement in the lining are as follows:
    filament: between 40% and 70%
    cement: between 30% and 60%
the proportions by weight of the constituents of the filament in the filament are as follows:
    mineral fibres: between 30% and 50%
    fibranne: between 30% and 50%
    copper filament: between 15% and 25% and the proportions by weight of the constituents of the cement in the cement are as follows:
    styrene/butadiene rubber: between 10% and 20%
    phenol/formaldehyde resin: between 7% and 13%
    carbon black: between 7% and 13%
    graphite: between 2% and 4%
    galena: between 10% and 20%
    Meudon white: between 7% and 13%
    barium sulphate: between 12% and 22%
    kaolin: between 7% and 13%
    zircon: between 3% and 7%
    sulphur: between 3% and 7%

16. A friction lining according to claim 1, wherein the said mineral fibres have a diameter of between 3 and 20 microns.

17. A friction lining according to claim 1, wherein the said fibres have an overall percentage by weight of CaO of about 27%.

18. A friction lining according to claim 1, wherein the said mineral fibres have a diameter of about 10 microns.

19. A friction lining containing between 10% and 55% by weight of mineral fibres which contain between 18% and 25% by weight of $Al_2O_3$, between 38% and 45% by weight of $SiO_2$, and between 23% and 33% of CaO.

* * * * *